US010681139B2

(12) United States Patent
Sullivan et al.

(10) Patent No.: US 10,681,139 B2
(45) Date of Patent: Jun. 9, 2020

(54) SYSTEM FOR ARRANGING AND CONTROLLING INTERCONNECTED INTELLIGENCES

(71) Applicant: Nova Dynamics, LLC, Philomath, OR (US)

(72) Inventors: Joseph Sullivan, Philomath, OR (US); Gabriel Maria, Corvallis, OR (US)

(73) Assignee: Nova Dynamics, LLC, Philomath, OR (US)

( * ) Notice: Subject to any disclaimer, the term of this patent is extended or adjusted under 35 U.S.C. 154(b) by 351 days.

(21) Appl. No.: 15/428,742

(22) Filed: Feb. 9, 2017

(65) Prior Publication Data
US 2018/0227392 A1    Aug. 9, 2018

(51) Int. Cl.
*H04L 29/08*    (2006.01)
(52) U.S. Cl.
CPC .................................. *H04L 67/12* (2013.01)
(58) Field of Classification Search
CPC .......... H04L 67/34; H04L 67/42; H04L 67/12
See application file for complete search history.

(56) References Cited

U.S. PATENT DOCUMENTS

| 6,085,183 | A | 7/2000 | Horn |
| 6,169,981 | B1 | 1/2001 | Werbos |
| 6,188,695 | B1 | 2/2001 | Przybysz |
| 6,347,398 | B1 | 2/2002 | Parthasarathy |
| 8,339,991 | B2 | 12/2012 | Biswas |
| 8,718,897 | B2 * | 5/2014 | Wright .................... B60L 15/20 701/89 |
| 2005/0027402 | A1 * | 2/2005 | Koibuchi .............. B60W 50/00 701/1 |
| 2017/0197615 | A1 * | 7/2017 | Elie ........................ B60W 10/20 |

* cited by examiner

*Primary Examiner* — Kim T Nguyen
(74) *Attorney, Agent, or Firm* — Dascenzo Intellecutal Property Law, P.C.

(57) ABSTRACT

Distant semi-autonomous systems containing their own processors and are capable of thinking for themselves, and to some extent, controlling lower functions is provided herein. These semi-autonomous systems may be referred to as "nodes". The network is not dependent on actual protocol or network topology. The brain, one or more central multiprocessors, is only tasked with issuing simpler, higher-level commands such as "faster" or "slower", or "execute a grabbing motion". These commands are then interpreted and executed by the nodes.

17 Claims, 4 Drawing Sheets

SYSTEM FOR ARRANGING AND CONTROLLING INTERCONNECTED INTELLIGENCES

BACKGROUND OF THE INVENTION

The present invention relates generally to decision making within a computer operating system, and more particularly, to a method for deciding by allowing components of a system to cast a vote and modifying future decisions by measuring the success of previous decisions.

BACKGROUND ART

A complex intelligent system such as a robot faces the challenge of handling high level problems such as navigation and human interaction, while simultaneously handling low level problems such as coordinated, graceful movement of body parts or monitoring and managing sub systems.

In humans and other mammals, the disparate functions of the body are controlled by a network running through the spinal column. While distant parts of the body may have some level of autonomous function, they all report to the brain with sense data, and listen to the brain for instructions.

There are various operating systems that are designed to perform complex tasks, for example the "Robot Operating System (ROS)" that describes itself as a "collection of tools, libraries, and conventions". There are also many network protocols that focus on transporting data from one place to another (i.e. CANBus, SPI, I2C, etc) and protocols that add higher layer features (CANOpen).

A primary aim in the design of computer systems is to make maximum utilization of all of the system equipment such as central or peripheral processors, input/output devices and other peripheral devices, in order to minimize the cost and time required to process a program with such systems. The present invention mimics the control over its body parts that a human or mammal possesses due to its brain and spinal column structure.

One approach to this problem is the design of computer systems that are capable of some sort of simultaneous operation of more than one of their processors or peripheral devices. For example, in one contemporary multiprogrammable system when execution of a central processor program by a central processor is interrupted by an instruction in that program requiring input/output processing by a particular device the central processor ceases execution of that program and begins execution of a supervisory program that causes the central processor to seek that particular device required by the central processor program and then transfer control to that device for performance of the input/output operation. If the designated device happens to be busy, the central processor waits until the device is free to transfer control. In the meantime, the primary function of the central processor, arithmetic and logic processing, is subordinated. When control has been transferred to the selected device, then the central processor may return to performing its primary duties with another central processor program awaiting processing.

Another contemporary multiprogrammable computer system achieves some degree of desired concurrence using a central processor served by a central memory and a plurality of peripheral devices each of which may store a user program, execute certain instructions, and communicate with input/output channels, the other peripheral devices and central memory. Suitable control means cause each peripheral processor to be interrogated periodically for requests for the services of the central processor. While a particular peripheral device seeks the services of the central processor for its program and while its program is receiving those services, that device is generally not performing any other processes, but is dormant. In such a system, the central processor is continuously active and perhaps fully utilized. However, all of the peripheral devices are not fully utilized, and the partial concurrence is achieved at the expense of using a plurality of peripheral devices, which themselves are substantial, limited capability computers, operating in a type of time sharing arrangement.

An additional shortcoming of certain conventional computer systems is their limited modular capability. For example, in the two types of systems discussed supra, the former system may require a revision of the central processor, input/output devices and the supervisory program should any changes to the central processor input/output arrangement be made. Similarly, the latter system requires extensive rearrangement of interconnections of all the peripheral devices upon addition or subtraction of such a device and significant modification to the system controls for such changes or for modifications to the central processor.

There arises a further need for a network super-architecture suitable for managing the interconnection of automated components.

BRIEF SUMMARY OF THE INVENTION

It is therefore an object of this invention to provide a multiprocessor, multiprogrammable computer system capable of concurrent processing of a plurality of programs or parts of programs making maximum utilization of all the system processors.

It is another object of this invention to provide a multiprocessor, multiprogrammable modular computer system containing peripheral devices, where each peripheral device may include its own processing unit for control device functions.

It is still another object of this invention to provide such a multiprocessor, multiprogrammable modular computer system which enables addition, subtraction and modification of any of the peripheral devices with minimal effect on the other system processers.

The invention features one or more multiprogrammable, multiprocessor computer systems including at least one central processor for performing arithmetic and logic operations. Storage means, adapted for storing central process programs associated with a central processor, is connected to one or more of the multiprocessors.

In an embodiment of the present invention, distant semi-autonomous systems contain their own processor and are capable of thinking for themselves to some extent and controlling lower functions. These semi-autonomous systems may be referred to as "nodes". The network is not dependent on actual protocol or network topology. The brain, one or more central multiprocessors, is only tasked with issuing simpler, higher-level commands such as "faster" or "slower", or "execute a grabbing motion". These commands are then interpreted and executed by the nodes.

Since each node in the network contains intelligence, the network itself may be said to be a distributed intelligent meta-machine.

Some provision is necessary at the top level for decision making. Each node may constantly broadcast a subset of its settings or state via a common bus.

The "brain" in the system is a higher order computer multiprocessor that gives commands and receives input. The brain may be composed of a system of computers and may also receive information from other sources such as vision cameras or an external operator. The brain is concerned with higher order problems than rote operation of individual components and instead gives the orders while leaving the details to the nodes.

Other novel features which are characteristics of the invention, as to organization and method of operation, together with further and advantages thereof will be better understood from the following description considered in connection with the accompanying figures, in which preferred embodiments of the invention are illustrated by way of example. It is to be expressly understood, however, that the figures are for illustration and description only and are not intended as a definition of the limits of the invention. The various features of novelty which characterize the invention are pointed out with particularity in the following description. The invention resides not in any one of these features taken alone, but rather in the combination of all its structures for the functions specified.

Figure 1:
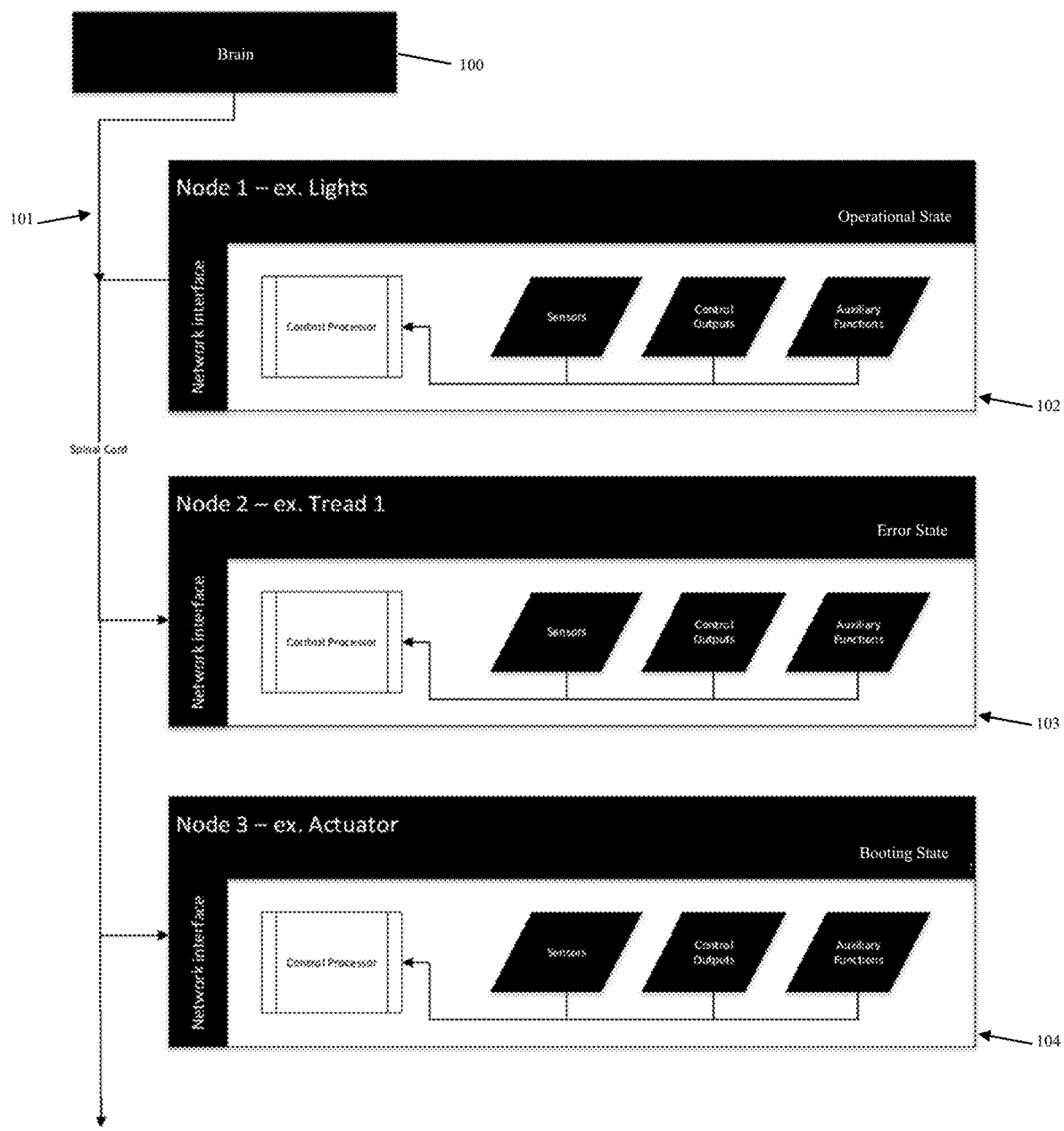
FIG. 1 is a block diagram showing a system for arranging and controlling interconnected intelligences as according to an embodiment of the present invention.

A further understanding of the present invention can be obtained by reference to a preferred embodiment set forth in the accompanying description. Although the illustrated embodiments are merely exemplary of methods for carrying out the present invention, both the organization and method of operation of the invention, in general, together with further objectives and advantages thereof, may be more easily understood by reference to the illustrations and the following description. The figures are not intended to limit the scope of this invention, but merely to clarify and exemplify the invention.

DETAILED DESCRIPTION OF THE INVENTION

In the following detailed description, reference is made to specific embodiments in which the invention may be practiced. These embodiments are described in sufficient detail to enable those skilled in the art to practice the invention. It is to be understood that the various embodiments of the invention, although different, are not necessarily mutually exclusive. Furthermore, a feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the terms "embodiment(s) of the invention", "alternative embodiment(s)", and "exemplary embodiment(s)" do not require that all embodiments of the method(s) or apparatus include the discussed feature, advantage or mode of operation. The following description of the preferred embodiment is merely exemplary in nature and is in no way intended to limit the invention, its application, or use.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter. Those skilled in the art will appreciate that the conception upon which this disclosure is based may be readily utilized as a basis for the designing of other structures, methods and systems for carrying out the purposes of the present invention. It is important, therefore, that any embodiments of the present invention be regarded as including such equivalent constructions insofar as they do not depart from the spirit and scope of the present invention.

Further, the purpose of the Abstract herein is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application nor is it intended to be limiting as to the scope of the invention in any way.

Referring now to the present invention, there is introduced a system for arranging and controlling interconnected intelligences. For the purpose of clarity, all like elements mentioned in this description will have the same designations. The terms "system for arranging and controlling interconnected intelligences", "networked collection of nodes", "distributed intelligence node network", "system", "invention", and "present invention" may be used interchangeably. In addition to the functions, features, components, and abilities of the invention already discussed in this specification, the invention may also have, but not be limited to, the following features contained within the description below.

Referring now to FIG. 1, there is presented a block diagram showing a system for arranging and controlling interconnected intelligences as according to an embodiment of the present invention. The system is a biologically-inspired arrangement and configuration of interconnected intelligences (102-104) that do not rely on a single protocol. This system is also self-diagnosing and self-healing. It is comprised of a collection of nodes (102-104) attached to a common bus (101) such that each node (102-104) is intelligent and responsible for controlling a sub system.

The arrangement and configuration of the system intrinsically separates complex actions into various systems with differing responsibility. Each node (102-104) is capable of self-healing and self-diagnosis. Each node (102-104) contains its own intelligence unit so that replacement of a node may not require reprogramming of system.

In some embodiments of the present invention, an ad hoc collection of nodes is provided that are able to self-organize and operate without the necessity of specialized instructions or prior training in any particular configuration.

The embodiment illustrated in FIG. 1 comprises a brain (100) connected via a common bus (101) to a light node (102), a tread node (103), and an actuator node (104). Such a collection of nodes (102-104) may be present in an autonomous vehicle as according to an embodiment of the present invention. The brain (101) is a higher order electronic computing device that transmits commands and receives input. In some embodiments, the brain (100) may be composed of a collection of electronic computing devices such as a plurality of computers. The brain (100) may receive input for external devices that are not connected to the common bus (101). In some embodiments of the present invention the brain (101) may receive input from a camera, microphone, GPS receiver or the like as are commonly found on autonomous vehicles.

The brain (100) control higher-level functions within the system such as whether to move an autonomous vehicle forward or backward, or whether to open the cargo bay of an autonomous vehicle. Operating instructions of each node (102-104) are computed and executed at the node (102-104) that is required to perform the action.

Nodes (102-104) within the system are responsible for maintaining their own state. These states can include an operational state where the node (102-104) is operating within acceptable operating parameters, an error state where the node (102-104) is not operating within acceptable operating parameters, or a booting state where the node (102-104) is in the process of initializing or coming on-line. Each node (102-104) may have a visual display indicator, such as a light, that displays its state. The visual display indicator can be used by technicians to quickly and easily determine the present state of the node (102-104).

A diagnostic connection to the common bus (101) is also provided in some embodiments that allow a user to issue commands to the system or observe the status of the system, brain (100), or nodes (102-104).

Nodes (102-104) within the system broadcast a signal on the common bus (101) that is received by other nodes (102-104) or the brain (100) indicating the status of the broadcasting node (102-104). This signal can be broadcast repeatedly at very short intervals so that a brain (100) within the system does not need to poll an individual node (102-104) to determine the status of that node (102-104).

Nodes (102-104) contain node-specific information that is communicated to other nodes (102-104) or the brain (100) on demand. This information can be used by the brain (100) to execute complex or specialized functions that the node (102-104) is capable of performing. This information may also contain the name or location of software modules containing machine-implemented instructions that the brain (100) can use to control a node's (102-104) operation. In some embodiments of the present invention, a node (102-104) controlling a robotic hand is expected to sense pain and move the individual mechanical fingers. The node's control processor might also respond to danger detected by the node's sensors by withdrawing the hand from the danger. However, if the node (102-104) communicates the location of software modules to the brain (100) containing machine-implemented instructions for more complex capabilities, such as picking up an object, then the brain will read those instructions and transmit commands to the hand node that cause it to pick up an object.

Nodes (102-104) contain a plurality of physical devices. Some nodes may contain a control processor, at least one sensor, a control output, and auxiliary functions or any combination thereof. Other nodes may contain physical devices or configurations of devices not illustrated in this FIG. 1. The control processor is an electronic computing device capable of executing machine-implemented instructions. The sensors can be embodiment-specific but may comprise such devices as cameras, microphones, sonar devices, radar devices, wireless receivers, infrared devices, odometers, GPS receivers, or the like. The auxiliary functions can be stored in an electronic memory module, such as a RAM or ROM chip. The combination of the devices within each node (102-104) and the machine-implemented instructions executed within the node comprise the intelligence of the node (102-104). There is no one exact combination of devices that comprise a node's (102-104) intelligence but rather is specific to the embodiment of the invention.

Nodes (102-104) may be queried for their existence by the brain (100) allowing the brain (100) to form an ad-hoc lexicon of available nodes (102-104). This allows the brain (100) to be programmed for a generic case, but adapt its abilities to different bodies of nodes (102-104). It also allows the brain (100) to detect damage when some nodes (102-104) cease to respond or go offline.

A node (102-104) may be optimized so that identical control processors may be used within different nodes (102-104). The same chip type of chip might be used as a tread node (103) control processor and as a light node (102) control processor. Each node (102-104) can be self-configuring. The control processor, during initial configuration, detects connected hardware, using a variable resistance or a DIP switch in the hardware by way of example, and downloads the correct operating system from a network or from a library of stored machine-implemented instructions in the brain (100). The control processor then reboots itself, this time coming online as a control processor for the node (102-104) in which it is installed. After initial configuration, the brain (100) detects a node of the type that the control processor is configured for. In an embodiment of the present invention, a control processor is installed in an actuator node (104). The control processor boots up, detects that it is installed in an actuator node (104), downloads machine-implemented instructions from the brain (100) by way of the common bus (101), reboots, then comes online as the control processor of the actuator node (104). The brain (100) now detects that an actuator node (104) is present within the system.

Figure 2:
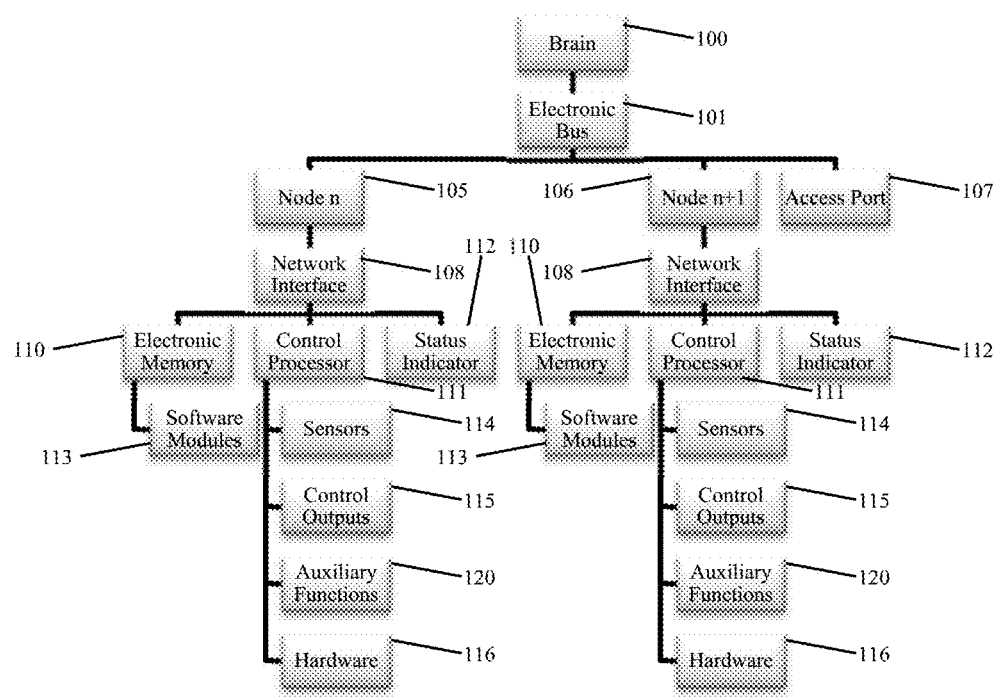
FIG. 2 is a hierarchy chart showing nodal relationships within a system for arranging and controlling interconnected intelligences as according to an embodiment of the present invention.

Referring now to FIG. 2, there is shown a hierarchy chart with nodal relationships within a system for arranging and controlling interconnected intelligences as according to an embodiment of the present invention. A brain (100) is connected to an electronic bus (101), referred to as the common bus (101) in FIG. 1, the electronic bus (101) connecting the brain (100) to a node n (105) and one or more additional nodes n+1 (106). The electronic bus is also connected to a communications access port (107) that allows a user to connect to the system for diagnostic or instruction purposes. Within a node (105, 106), there is a network interface device (108), an electronic memory device (110), a control processor (111), a status indicator (112), at least one software module (113) that contains at least one machine-implemented instruction, sensor devices (114), control outputs (115), auxiliary functions (120), and physical hardware (116).

The network interface (108) is an electronic device capable of executing machine-implemented instructions that change the physical configuration of the network interface (108) so that electronic communications may be broadcast or received on the electronic bus (101). The network interface (108) passes communications from the node (105, 106) to the brain (100) via the electronic bus (101).

The control processor (111) is an electronic computing device, such as a computer processor, that executes machine-implemented instructions to control the operation of the node (105, 106).

The electronic memory device (110) can contain machine-implemented instructions, such as software or software modules (113), that instruct the brain (100) or the control processor (111) how to control the node (105, 106). These instructions can be specialized instructions for complex tasks or can be nodal component instructions such as an operating system for newly-installed control processors (111).

The status indicator (112) is a visual indicator that visually displays the status or state of a node (105, 106). The status indicator can be quickly referenced by a user wishing to know the status or operating state of the node (105, 106). Generally, the visual indicator provides a benefit to users wishing to program or troubleshoot a system.

The sensor devices (114) are specific to the type of node (105, 106) that they are installed. That is, an arm node may have a pressure sensor or position sensor while a tread node may have an odometer or power sensor. The exact sensor present in each node (105, 106) will vary from embodiment to embodiment and from node to node. Furthermore, the same type of node (105, 106) may have different sensors depending on the embodiment.

The control outputs (115) connect the node (115) to hardware (116) that perform physical tasks. The control outputs (115) transfer the electronic commands issued by the control processor devices (111) or the brain (100) to the device that performs physical actions. In an embodiment of the present invention, a control output (115) is connected to an electronic motor that causes a drive wheel on an autonomous vehicle to turn. When the control processor device (111) or brain (100) issues an electronic command for the motor to operate, that command is transmitted through the control output (115) to the electronic motor. The motor activates and the drive wheel turns.

The auxiliary functions (120) are any other functions that a node (106, 106) is required to perform. The exact auxiliary functions (120) that a node (105, 106) performs will differ from embodiment to embodiment.

Figure 3:
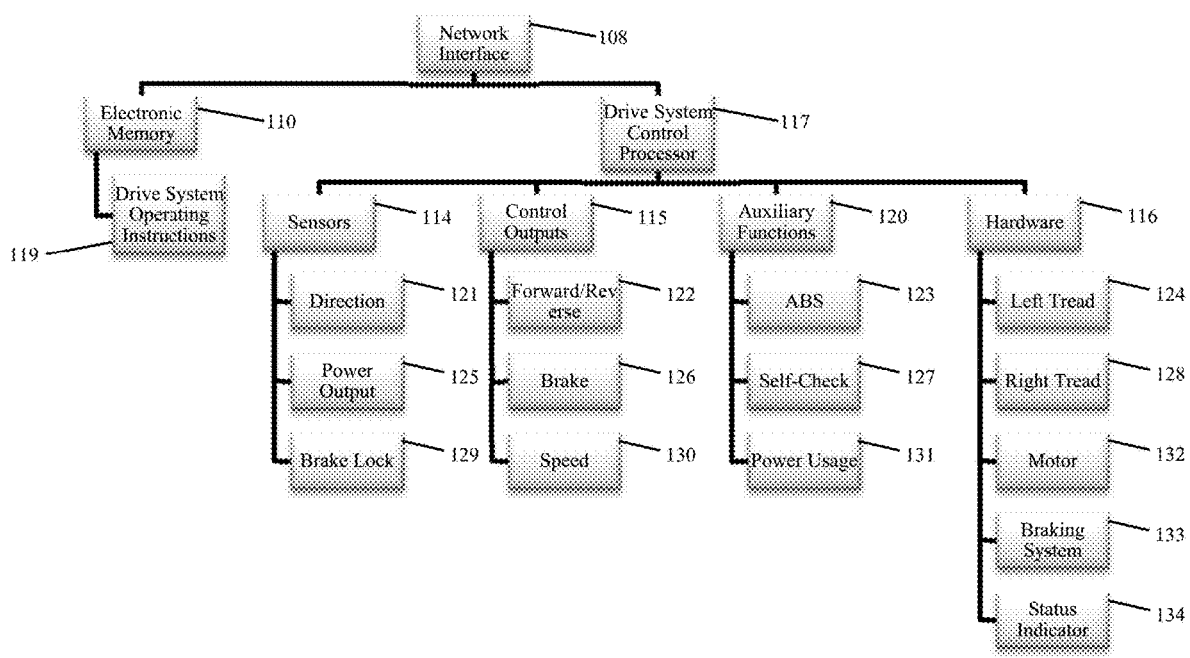
FIG. 3 is a hierarchy chart showing a drive system node within a system for arranging and controlling interconnected intelligences as according to an embodiment of the present invention.

Referring now to FIG. 3, there is shown a hierarchy chart of a drive system node within a system for arranging and controlling interconnected intelligences as according to an embodiment of the present invention. The drive system node has a network interface (108) that connects the node to an electronic bus. A drive system control processor (117) executes one or more machine-implemented instructions and controls the operation of the node. The machine-implemented instructions may be a series of operating steps stored as software in the electronic memory module (110) of the node. The electronic memory module (110) may store other information, such as sensor (114) data, instructions received from a system brain or the like, but is configured to store the drive system operating instructions (119). The drive system operating instructions (119) is the software module that is communicated to the drive system control processor (117) and is executed by the processor (117) during operation of the node. In addition to executing the software algorithms contained within the drive system operating instructions (119) The drive system control processor (117) can receive electronic information from, and transmit instructions to, the various components of the node.

A plurality of sensors (114) is included within the node. In the illustrated drive system node, the sensors include a direction-sensing sensor (121), a drive power output sensor (125), and a brake lock sensor (126). The sensors (121, 125, 129) monitor conditions in the node's environment and pass electronic information to other components within the node. The electronic information transmitted by each sensor (121, 125-129) can be received by the drive system control processor (117) so that the processor (117) can generate commands to properly control the node, or may be received by hardware (116) components that are capable of executing independent instructions. In an embodiment of the present invention, a brake lock sensor (129) detects the braking system (133) has caused the left tread and right tread (124, 128) to completely lock. The brake lock sensor (129) transmits a locked state indication to the braking system (133) and the braking system (133) executes an anti-lock series of machine-implemented instructions that result in a rapid pulsing of the brakes. In another embodiment of the present invention, the brake lock sensor (129) detects a locked state, transmits that locked state to the drive system control processor (117), the processor (117) instructs an ABS auxiliary function (123) to pulse the brakes. The ABS auxiliary function (123) executes a series of machine-implemented instructions for the pulsing of the brakes, and transmits one or more commands to the braking system (133).

The node possesses one or more control outputs (115) that interface with hardware components (116) of the node. Each control output (122, 126, 130) is configured to interface with a specific type of hardware (116). A control output can translate commands transmitted by the control processor (117) or other node components into machine-implemented instructions that can be received and interpreted by the hardware component (116) that is connected to the output (122, 126, 130).

In an embodiment of the present invention, a forward and reverse control output (122) interfaces with a motor (132) within an automated delivery vehicle. The forward and reverse output (122) receives instructions from a drive system control processor (117) and translates those instructions into commands that are readable by the motor (132). When the processor (117) broadcasts an instruction for the motor (132) to move the vehicle forward, the forward and reverse output (122) receives that instruction then translates it into a form or protocol that directs the motor (132) to operate so that the vehicle's treads (124, 128) move the vehicle forward. When the processor (117) broadcasts an instruction for the motor (132) to move the vehicle backward, the forward and reverse output (122) receives that instruction then translates it into a form or protocol that directs the motor (132) to operate so that the vehicle's treads (124, 128) move the vehicle in reverse.

In an embodiment of the present invention, a brake control output (126) interfaces with a braking system (133) within an automated delivery vehicle. The brake control output (126) receives instructions from a drive system control processor (117) and translates those instructions into commands that are readable by the braking system (133). When the processor (117) broadcasts an instruction for the braking system (133) to stop the vehicle, the brake control output (126) receives that instruction then translates it into a form or protocol that directs the braking (132) to reduce movement of the vehicle's treads (124, 128).

In an embodiment of the present invention, a speed control output (130) interfaces with a motor (132) within an automated delivery vehicle. The speed control output (130) receives instructions from a drive system control processor (117) and translates those instructions into commands that are readable by the motor (132). When the processor (117) broadcasts an instruction for the motor (132) to increase the speed of the vehicle, the speed control output (130) receives that instruction then translates it into a form or protocol that directs the motor (130) increase power output and rotate the vehicle's treads (124, 128) more rapidly. The speed control sensor can receive input from a power output sensor (125) or an odometer to properly modulate the speed of the vehicle. When a control output receives information directly from an onboard sensor, the computing burden on the processor (117) is lessened thereby freeing up computational power for other high level tasks.

The node possesses diagnostic and self-check (127) abilities. The self-check auxiliary function (127) can perform internal diagnostics and report the result to a system controller. When one or more components within the node are damaged or non-operative, the self-check function (127) will report the information to the drive system control processor (117) which, in turn, will decide how to handle the problems. If alternate functionality within the node is possible, the processor (117) will execute instructions so that the node can continue to perform its function. If the errors are unresolvable at the nodal level, the processor (117) is configured to communicate via the network interface (108) to a higher-level processor that will take appropriate actions such as notifying human controllers.

A status indicator (134) may be attached that indicates the operating state of the node. In an embodiment of the present invention, the status indicator (134) glows a steady green when the node is operating properly, flashes red when the node is booting up, and glows a steady red when the node is not operating properly.

The node can monitor power usage (131) as one of its auxiliary functions (120). The information from the power usage auxiliary function (131) can be reported to the processor (117) or other nodal components so that onboard power reserves can be properly maintained. Excessive power usage may indicate a fault with one of the node components or elsewhere within the overall system.

Figure 4:
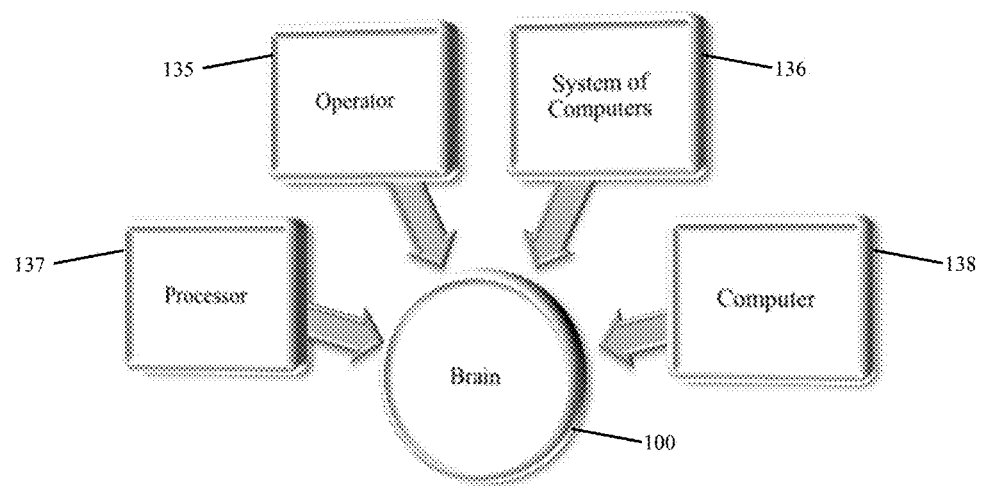
FIG. 4 is a relationship chart showing several types of entities that may be used as a brain within a system for arranging and controlling interconnected intelligences as according to an embodiment of the present invention.

Referring now to FIG. 4, there is shown a relationship chart depicting several types of entities that may be used as a brain (100) within a system for arranging and controlling interconnected intelligences as according to an embodiment of the present invention. The brain (100) can be a higher order computer (138) or computer processor (137) that is attached by way of a communication bus directly to a collection of nodes, or wirelessly to the nodes. In a wireless embodiment, the higher order computer (138) or higher order computer processor (137) communicates with the collection of nodes via any one of a plurality of wireless communication protocols including, but not limited to, cellular communication, Wi-Fi communication, or by other types of wireless data transmission protocols.

The brain (100) can also be a collection of computers (136) attached directly or wirelessly to the collection of nodes. For purposes of this description, a collection of computers can include a cloud-based server system.

The brain can also be a human operator (135) that interacts with the collection of nodes via a wireless communication protocol. The operator (135) can receive information from the system including sensor data, node status, operational mode, and the like. The operator (135) can issue higher-level commands including, but not limited to, move system forward, stop, open cargo door, increase or reduce speed, and return to base.

The term "higher order" means the brain primarily handles overall system functionality and coordinates the actions of one or more nodes. The brain relies on nodal processors to handle the rote operation of mechanical components such as how to operate a tread or how to rotate a camera. Rather, the brain issues instructions relating to system navigation, coordinated movement of body parts, or monitoring and managing subsystems.

Those skilled in the art will appreciate that the conception, upon which this disclosure is based, may readily be utilized as a basis for designing other structures, methods, and systems for carrying out the several purposes of the present invention. It is important, therefore, that this description be regarded as including such equivalent constructions insofar as they do not depart from the spirit and scope of the present invention.

Although certain example methods, apparatus, apparatus and articles of manufacture have been described herein, the scope of coverage of this application is not limited thereto. On the contrary, this application covers all methods, apparatus and articles of manufacture fairly falling within the scope of the invention either literally or under the doctrine of equivalents.

Therefore, the foregoing is considered as illustrative only of the principles of a method for re-mapping a safe and traversable route during delivery operations. Further, since numerous modifications and changes will readily occur to those skilled in the art, it is not desired to limit the method for re-mapping a safe and traversable route during delivery operations to the exact construction and operation described, and accordingly, all suitable modifications and equivalents may be resorted to, falling within the scope of the present invention. While the above description describes various embodiments of the present invention, it will be clear that the present invention may be otherwise easily adapted to fit other configurations.

As various changes could be made in the above constructions without departing from the scope of the invention, it is intended that all matter contained in the above description shall be interpreted as illustrative and not in a limiting sense.

What is claimed is:

1. A hierarchical multiprogrammable modular computer system of interconnected intelligences for controlling a robot, the system comprising:
a brain, a plurality of interconnected nodes, a plurality of hardware components, and a communications bus, wherein the brain and the plurality of interconnected nodes are attached to the communications bus, and wherein the brain is configured to issue higher-level system commands for robot control through the communications bus to each node of the plurality of interconnected nodes;
wherein each node of the plurality of interconnected nodes is attached to at least one attached hardware component of the plurality of hardware components, wherein each node of the plurality of interconnected nodes comprises a control processor, wherein the control processor is configured to receive the higher-level system commands from the brain and translate the higher-level system commands into specific machine-implemented instructions to be executed through the at least one attached hardware component;
wherein at least one node of the plurality of interconnected nodes comprises a memory module, wherein the at least one node is configured to download information from the brain, and wherein the at least one node is configured to store the information downloaded from the brain to the memory module, and wherein the at least one node is configured to access the information stored in the memory module; and wherein the at least one node of the plurality of interconnected nodes is self-configuring, such that the at least one node of the plurality of interconnected nodes is configured to detect the at least one attached hardware component and download a correct operating system from the brain for controlling the at least one attached hardware component, and wherein the correct operating system comprises specialized machine-implemented instructions for controlling the at least one attached hardware component.

2. The system of claim 1, wherein the brain is configured to access a library of operating systems.

3. The system of claim 2, wherein the brain comprises a central memory module, and wherein the library of operating systems is stored on the central memory module.

4. The system of claim 1, wherein the robot is an autonomous driving vehicle.

5. A method for arranging the system of claim 1, the method comprising:
   connecting the at least one node of the plurality of interconnected nodes to the at least one attached hardware component of the plurality of hardware components;
   connecting the at least one node of the plurality of interconnected nodes to a brain;
   detecting by the at least one node the at least one attached hardware component, and downloading by the at least one generic node from the brain, the correct operating system that comprises the specialized machine-implemented instructions for controlling the at least one attached hardware component; and
   rebooting the at least one node as a specialized node that is specialized for controlling the at least one hardware component once the correct operating system is downloaded.

6. The method of claim 5, wherein the specialized node specializes in performing at least one specialized function by controlling the at least one attached hardware component.

7. The method of claim 6, further comprising controlling the at least one attached hardware component by the specialized node to perform the at least one specialized function.

8. The method of claim 5, further comprising causing the brain to recognize the specialized node and the at least one attached hardware component that the specialized node specializes in controlling.

9. The method of claim 8, further comprising causing the brain to form a lexicon comprising the specialized node and the at least one attached hardware component that the specialized node specializes in controlling.

10. The method of claim 5, further comprising causing a memory module included in the at least one node to store the specialized machine-implemented instructions.

11. The method of claim 5, further comprising causing the brain to issue at least one higher-level system command for robot control to the specialized node.

12. The method of claim 11, further comprising causing the specialized node to receive the at least one higher-level system command from the brain, to translate the at least one higher-level system command, and to execute the at least one higher-level system command using the specialized machine-implemented instructions.

13. The system of claim 1,
   wherein each node of the plurality of interconnected nodes is configured to command a specific aspect of robot control, and wherein each node is configured to broadcast information to the brain and to at least one other node of the plurality of interconnected nodes;
   wherein the at least one node is configured to store node-specific information on the memory module, wherein the node specific-information includes information on the specific aspect of robot control the at least one node is configured to command, wherein the node-specific information further includes information on a status of the at least one node, and wherein the status includes one of an error state and an operational state; and
   wherein the at least one node of the plurality of interconnected nodes is configured to access the node-specific information, and further wherein the at least one node is configured to broadcast the node-specific information to the brain and the at least one other node of the plurality of interconnected nodes.

14. The system of claim 13, wherein, each node of the plurality of interconnected nodes includes one or more control outputs, wherein the one or more control outputs connect each node to the at least one attached hardware component, and wherein the one or more control outputs are configured to transfer the specialized machine-implemented instructions to the at least one attached hardware component to cause the at least one attached hardware component to execute the specialized machine-implemented instructions.

15. The system of claim 14, wherein the at least one node of the plurality of interconnected nodes is configured to perform a self-check function, wherein the self-check function determines when the at least one attached hardware component is operative, and wherein the self-check function determines when the at least one attached hardware component is non-operative.

16. The system of claim 15, wherein the status of the at least one node is an error state when the self-check function determines the at least one attached hardware component is non-operative, and the status of the at least one node is an operational state when the self-check function determines the at least one attached hardware component is operative.

17. The system of claim 13 wherein the brain is configured to query each node for its existence and form a lexicon of available nodes, wherein the lexicon of available nodes comprises information respective to the specific aspect of robot control that each available node is configured to command.

* * * * *